UNITED STATES PATENT OFFICE.

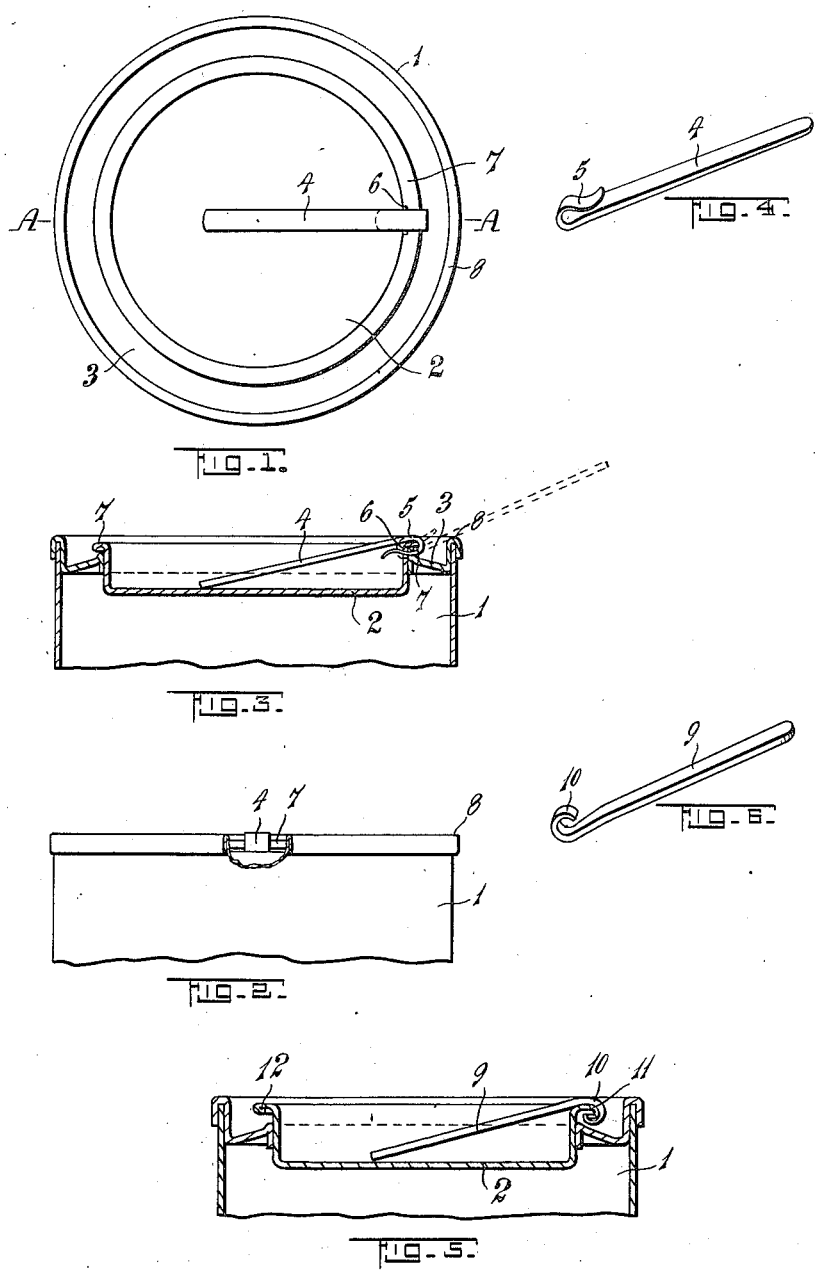

PURCELL T. WEBB, OF MASTERTON, NEW ZEALAND.

OPENING CONTAINERS.

1,230,961.  Specification of Letters Patent.  Patented June 26, 1917.

Application filed October 8, 1913. Serial No. 794,183.

*To all whom it may concern:*

Be it known that I, PURCELL THOMAS WEBB, a citizen of the Dominion of New Zealand, and residing at Masterton, in the Provincial District of Wellington, in the Dominion of New Zealand, have invented certain new and useful Improvements in Opening Containers, of which the following is a specification.

The invention relates to the class of containers in which a dished lid is adapted to tightly fit a hole in the top, and its object is to provide readily available means for removing the lid.

According hereto a lever is attached, hinge fashion, to the flange of the lid, and the edge of the top of the container is used as a fulcrum for the lever when removing the lid.

The invention, as applied to a cylindrical container is illustrated in the drawing, wherein:

Figure 1 is a plan of the container.

Fig. 2 an elevation of the upper part thereof.

Fig. 3 a sectional part elevation on A A Fig. 1.

Fig. 4 a side perspective elevation of a lever.

Fig. 5, is a view corresponding to Fig. 3 illustrating a modification.

Fig. 6, a side perspective elevation of a lever used in connection with the said modification.

The cylindrical container, 1, is fitted with the circular dished lid, 2, which fits tightly a hole in the top, 3, in a well known manner.

A lever, 4, has a hook, 5, at its end which engages in a hole, 6, punched in the flange of the lid just beneath the beaded edge, 7, thereof, said lever being thus hinged to the lid, so that it may turn over to lie within the dish thereof (as clearly shown in Fig. 3) or may be turned diametrically outward from the lid (as shown in dotted lines Fig. 3) to bear upon the upper edge, 8, of the container, which serves as a fulcrum when the lever is employed for removing the lid.

The hook is shaped as shown, is made comparatively thin at its end, and preferably of spring metal so that it may be passed into engagement with the beaded edge of the lid and through the punched hole, while it will not be likely to become disengaged.

If it is considered a disadvantage to punch the hole through the edge of the lid, the modification shown in Figs. 5 and 6 may be used therein.

The lever, 9, has the hook, 10, which engages over the bead, 11, upon the edge of the lid.

To place the hook over the bead, the bead at one place, 12, may be flattened or cut away to enable the lever to be passed on circumferentially.

The invention may be employed without modification upon containers of oval, rectangular or other shape.

There obviously are other ways of hinging the lever. I have herein shown a method which is simple and convenient.

What I do claim and desire to secure by Letters Patent of the United States is:

1. In combination, a container, a top to said container disposed at a level below the upper edge of said container, a dished lid adapted to close a hole in said top and having the whole of its upper edge at a lower level than the upper edge of said container when in position, and a removable lever normally lying within said dished lid and having a hook-shaped end, such end being hinged to the top edge of the dished lid, and the fulcrum point of the lever lying between said hook-shaped end and the end of the lever which is manipulated by the hand.

2. In combination, a container, a top to said container, a dished lid adapted to close a hole in said top and having the whole of its upper edge at a lower level than the upper edge of said container when in position, a bead formed around the upper edge of said dished lid and compressed at one point so as to form a recess, and a lever, normally lying within said dished lid, having an end in the form of an open hook which hingedly engages said bead after being moved radially through said recess and then moved around the periphery of said bead substantially as described.

In testimony whereof I have signed my name to this specification in the presence of two witnesses.

PURCELL T. WEBB.

Witnesses:
HEWRIE HAMPTON RAYWARD,
JOHN JOSEPH WATSON.